(12) United States Patent
Ando et al.

(10) Patent No.: US 8,548,724 B2
(45) Date of Patent: Oct. 1, 2013

(54) POSITIONING TERMINAL AND SERVER

(75) Inventors: Tomohiro Ando, Kanagawa (JP); Makoto Ueda, Kanagawa (JP); Takenori Horiuchi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 261 days.

(21) Appl. No.: 13/037,738

(22) Filed: Mar. 1, 2011

(65) Prior Publication Data

US 2011/0218731 A1 Sep. 8, 2011

(30) Foreign Application Priority Data

Mar. 3, 2010 (JP) ................. 2010-046506

(51) Int. Cl.
G01C 21/00 (2006.01)
(52) U.S. Cl.
USPC ............. 701/207; 701/532; 701/426; 701/16; 342/451
(58) Field of Classification Search
USPC .................. 701/532, 533, 426, 411, 410, 16, 701/207; 370/252, 250; 380/270; 600/347; 355/72; 356/614; 347/252, 224; 455/456.1; 318/601; 235/404; 342/394; 360/77.08
See application file for complete search history.

(56) References Cited

U.S. PATENT DOCUMENTS

| | | | |
|---|---|---|---|
| 6,067,484 A * | 5/2000 | Rowson et al. ................. | 701/16 |
| 7,460,064 B1 | 12/2008 | Tester et al. | |
| 2004/0172191 A1* | 9/2004 | Vitikainen et al. ............ | 701/208 |
| 2011/0010091 A1* | 1/2011 | Currie et al. ................. | 701/208 |
| 2012/0229340 A1* | 9/2012 | Henry et al. .................. | 342/451 |

FOREIGN PATENT DOCUMENTS

| | | |
|---|---|---|
| DE | 10247251 A1 | 4/2004 |
| EP | 2072951 A2 | 6/2009 |
| JP | 2004144558 A | 5/2004 |
| JP | 2005309513 A | 11/2005 |
| JP | 2009135915 A | 6/2009 |
| WO | 9963360 A2 | 12/1999 |

OTHER PUBLICATIONS

Extended European Search Report for EP Patent Application No. 11 156 341.7, dated May 4, 2011.
Deblauwe, Nico., "Hybrid GPS and GSM Localization Energy-efficient Detection of Spatial Triggers", Proceedings of the 5th Workshop on Positioning, Navigation and Communication 2008(WPNC 2008).
Internet <URL:http://www.nttdocomo.co.jp/info/news_release/page/091110_00.html#p02>).

(Continued)

Primary Examiner — Behrang Badii
(74) Attorney, Agent, or Firm — MKG, LLC

(57) ABSTRACT

The positioning terminal of the present invention includes a positioning unit 103 configured to perform positioning processing for acquiring position information which indicate a current position of the positioning terminal, a route storage unit 104 configured to store a registered route formed by concatenating location points indicated by position information previously acquired by the positioning unit 103, a route matching determining unit 106 configured to determine whether or not the positioning terminal 10 moves on the registered route, and a continuous positioning control unit 109 configured to change a positioning interval at which the positioning unit 103 performs positioning processing from a time interval TI1 to a time interval TI2 which is longer than the time interval TI1, when it is determined that the positioning terminal moves on the registered route.

9 Claims, 15 Drawing Sheets

(56) References Cited

OTHER PUBLICATIONS

Nico DeBlauwe et al., Hybrid GPS and GSM Localization—Energy-efficient Detection of Spatial Triggers, WPNC 2008, 5th, Mar. 27, 2008, pp. 181-189.
First Notification of Office Action for Chinese Patent Application No. 201110051737.2, Date of Issuance Aug. 13, 2012, pp. 1-16.
Second Notification of Office Action for Chinese Patent Application No. 201110051737.2, Date of Issuance Jan. 28, 2013, pp. 1-4.
Communication with Extended European Search Report for EP Patent Application No. 11156341.7-2412, Dated May 4, 2011, pp. 1-10.

* cited by examiner

| LOCATION POINT | POSITION INFORMATION (LONGITUDE, LATITUDE) | DAY OF THE WEEK | TIME |
|---|---|---|---|
| P1 | N35° x1 E139° y1 | MONDAY | 6:00~9:00 |
| P2 | N35° x2 E139° y2 | MONDAY | 6:00~9:00 |
| P3 | N35° x3 E139° y3 | MONDAY | 6:00~9:00 |
| ... | ... | ... | ... |
| Pn | N35° xn E139° yn | MONDAY | 6:00~9:00 |

FIG. 6

POSITIONING TERMINAL AND SERVER

CROSS REFERENCE TO RELATED APPLICATION

This application is based upon and claims the benefit of priority from the prior Japanese Patent Application No. 2010-046506, filed on Mar. 3, 2010; the entire contents of which are incorporated herein by reference.

BACKGROUND OF THE INVENTION

Field of the Invention

The present invention relates to a positioning terminal and a server used for a continuous positioning system in which a positioning terminal periodically performs positioning processing and transmits position information acquired by the positioning processing to an information delivery server.

In recent years, a continuous positioning system using a "continuous positioning function" is known, in which a positioning terminal such as a mobile phone periodically performs positioning processing using GPS and transmits position information acquired by the positioning processing to an information delivery server such as a content provider (e.g., "Overview of auto GPS" [online], [searched on Jan. 7, 2010], Internet <URL: http://www.nttdocomo.co.jp/info/news_release/page/091110_00.html#p02>).

In the continuous positioning system, the positioning terminal periodically performs positioning processing in the background using GPS and transmits position information acquired by the positioning processing to the information delivery server. The information delivery server delivers information corresponding to position information from the positioning terminal (e.g., weather information and sightseeing information at the current position, information on the last train from the current site or the like) to the positioning terminal.

However, in the continuous positioning system, since the positioning terminal periodically performs positioning processing in the background using GPS, there is a problem that power consumption of the positioning terminal increases.

SUMMARY OF THE INVENTION

The present invention resides in one aspect in a positioning terminal and a server capable of preventing power consumption from increasing, in a continuous positioning system in which the positioning terminal periodically performs positioning processing and transmits position information acquired by the positioning processing to an information delivery server.

A positioning terminal according to a first aspect of the present invention includes a positioning unit configured to perform positioning processing for acquiring position information which indicate a current position of the positioning terminal, a storage unit configured to store a registered route formed by concatenating location points indicated by position information previously acquired by the positioning unit, a determining unit configured to determine whether or not the positioning terminal moves on the registered route, and a positioning interval control unit configured to change a positioning interval at which the positioning unit performs the positioning processing from a first time interval to a second time interval which is longer than the first time interval, when the determining unit determines that the positioning terminal moves on the registered route.

A positioning terminal according to a second aspect of the present invention includes a positioning unit configured to perform positioning processing for acquiring position information indicating a current position of the positioning terminal, a position information reporting unit configured to transmit the position information acquired by the positioning unit to a server, a determination result receiving unit configured to receive, from the server, a determination result as to whether or not the positioning terminal moves on a registered route formed by concatenating location points indicated by position information previously acquired by the positioning unit, and a positioning interval control unit configured to change a positioning interval at which the positioning unit performs the positioning processing from a first time interval to a second time interval which is longer than the first time interval, when the determination result receiving unit receives a determination result that the positioning terminal moves on the registered route.

A server according to a second aspect of the present invention includes a receiving unit configured to receive, from a positioning terminal, position information indicating a current position of the positioning terminal, a storage unit configured to store a registered route formed by concatenating location points indicated by position information previously received by the receiving unit, a determining unit configured to determine whether or not the positioning terminal moves on the registered route and a reporting unit configured to report a determination result by the determining unit to the positioning terminal, when the determining unit determines that the positioning terminal moves on the registered route.

BRIEF DESCRIPTION OF THE DRAWINGS

FIG. 6 is a diagram illustrating an example of the registered route of the route storage unit according to the first embodiment of the present invention;

DETAILED DESCRIPTION

Figure 1:
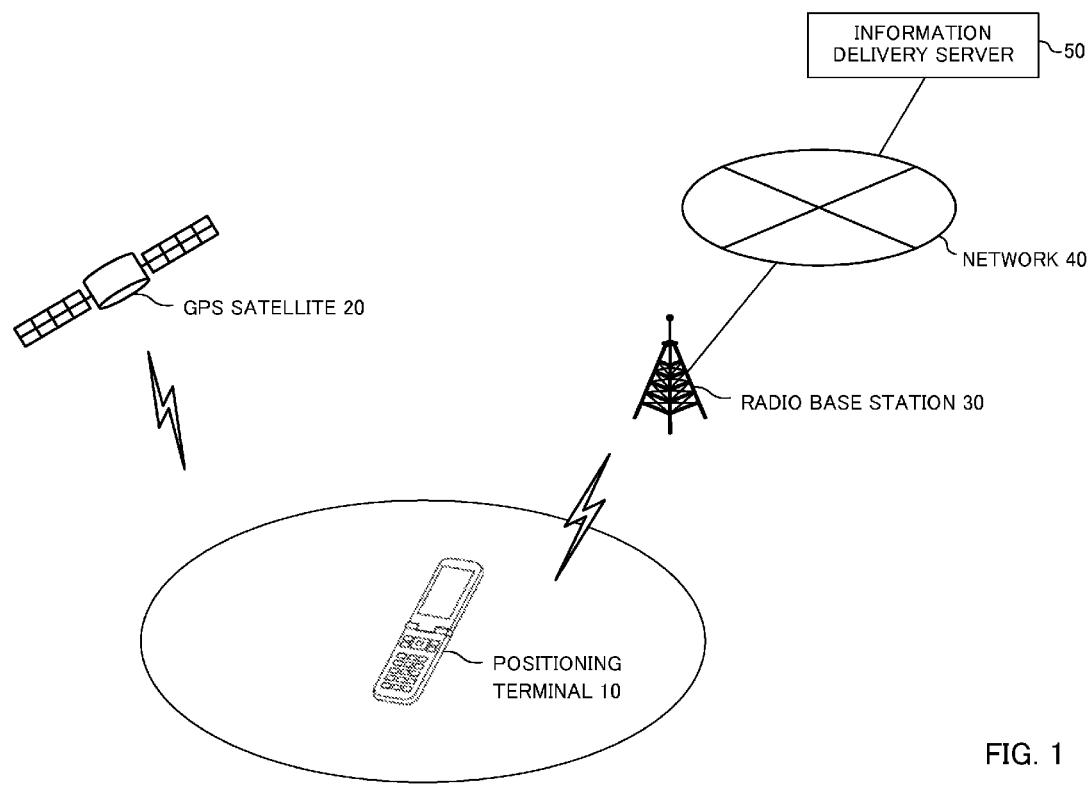
FIG. 1 is a schematic configuration diagram of a continuous positioning system according to a first embodiment of the present invention.

FIG. 1 is a schematic configuration diagram of a continuous positioning system according to a first embodiment. As shown in FIG. 1, the continuous positioning system according to the first embodiment includes a positioning terminal 10, a GPS satellite 20 that transmits a GPS signal to the positioning terminal 10 and an information delivery server 50 that delivers information corresponding to position information of the positioning terminal 10 to the positioning terminal 10 via a radio base station 30 and a network 40.

In the continuous positioning system, the positioning terminal 10 periodically performs positioning processing for acquiring position information indicating the current position of the positioning terminal based on a GPS signal from the GPS satellite 20 in the background. Furthermore, the positioning terminal 10 transmits position information acquired by the positioning processing to the information delivery server 50 via the radio base station 30 and the network 40 and acquires information corresponding to the position information (e.g., weather information and sightseeing information at the current position, information on the last train from the current site) from the information delivery server 50.

Next, the configuration of the positioning terminal according to the first embodiment will be described. The positioning terminal 10 is a terminal that supports a "continuous positioning function" and is, for example, a mobile phone terminal, notebook personal computer or portable game machine.

Figure 2:
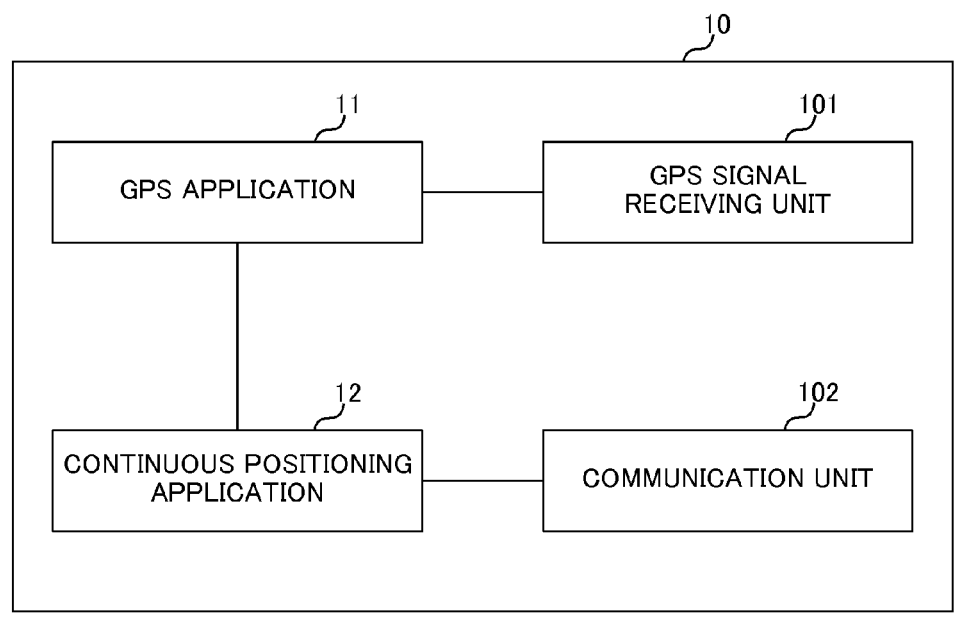
FIG. 2 is a diagram illustrating an application configuration of a positioning terminal according to the first embodiment of the present invention.

FIG. 2 is a schematic view illustrating an application configuration of the positioning terminal according to the first embodiment. As shown in FIG. 1, the positioning terminal 10 is provided with a GPS signal receiving unit 101 that receives a GPS signal from the GPS satellite 20 and a communication unit 102 that transmits/receives a communication signal to/from the radio base station 30, and is provided with a GPS application 11 that performs positioning processing based on the GPS signal received by the GPS signal receiving unit 101 and a continuous positioning application 12 that controls a positioning interval at which the GPS application 11 performs positioning processing.

Figure 3:
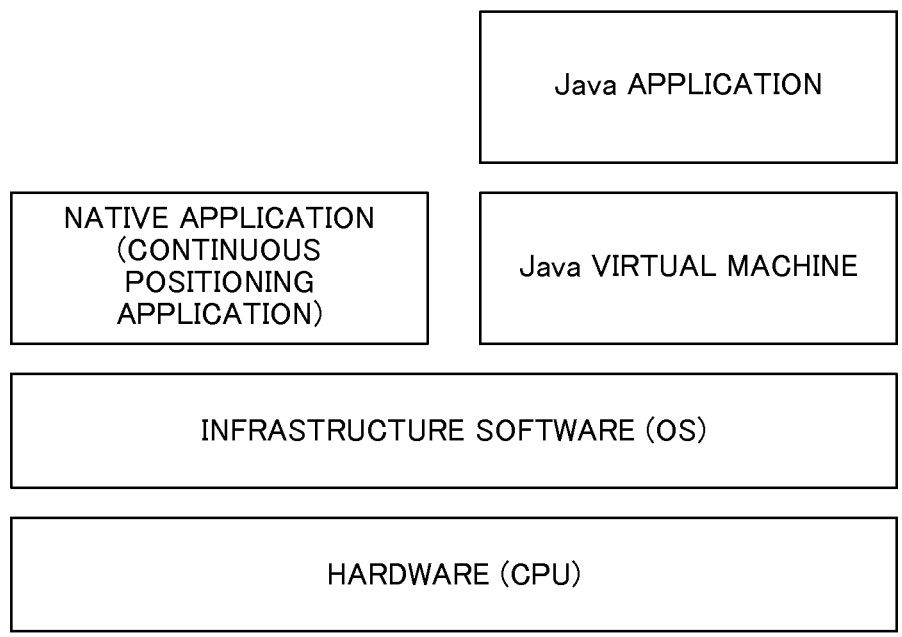
FIG. 3 is a schematic view of a layered structure of the positioning terminal according to the first embodiment of the present invention.

FIG. 3 is a schematic view of a layered structure of the positioning terminal according to the first embodiment. The positioning terminal 10 is configured to execute processing using a layered structure made up of layers of hardware such as a CPU, infrastructure software such as an OS and various applications. The continuous positioning application 12 installed in the positioning terminal 10 is constructed as a native application that directly operates on the OS. Thus, the positioning terminal 10 that supports the "continuous positioning function" constructs the continuous positioning application 12 not as a Java (registered trademark) application operating on a Java (registered trademark) virtual machine mounted on the OS, but as a native application, and thereby enables a background operation or discontinuous operation and intends to achieve power saving by eliminating code conversion processing and screen drawing processing necessary for the Java (registered trademark) application.

Figure 4:
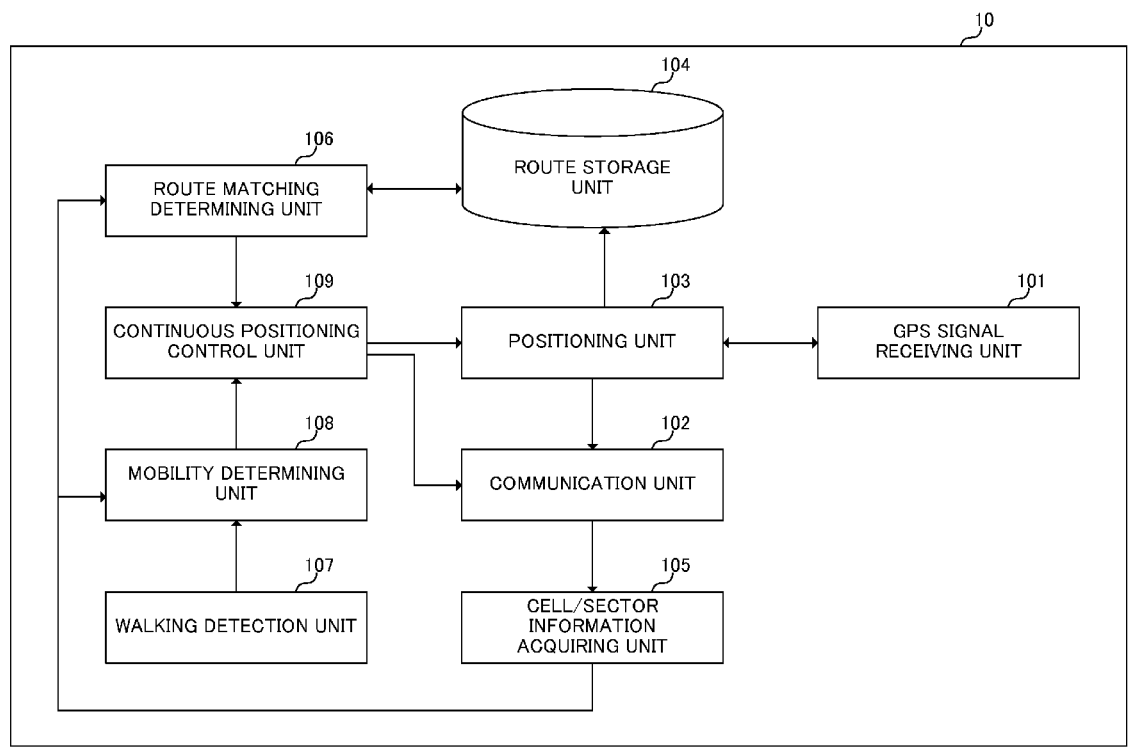
FIG. 4 is a functional configuration diagram of the positioning terminal according to the first embodiment of the present invention.

Next, the functional configuration of the positioning terminal 10 achieved by the above described continuous positioning application 12 and the GPS application 11 will be described with reference to FIG. 4. FIG. 4 is a functional configuration diagram of the positioning terminal according to the first embodiment. As shown in FIG. 4, the positioning terminal 10 is provided with a positioning unit 103, a route storage unit 104, a cell/sector information acquiring unit 105, a route matching determining unit 106, a walking detection unit 107, a mobility determining unit 108 and a continuous positioning control unit 109 in addition to the GPS signal receiving unit 101 and the communication unit 102.

The GPS signal receiving unit 101 receives a GPS signal from the GPS satellite 20 according to a receiving instruction from the positioning unit 103. The GPS signal receiving unit 101 outputs the received GPS signal to the positioning unit 103.

The communication unit 102 transmits/receives a radio signal to/from the radio base station 30. To be more specific, the communication unit 102 (position information reporting unit) transmits position information indicating the current position of the positioning terminal 10 to the information delivery server 50 via the radio base station 30 and the network 40. The transmission condition of position information by the communication unit 102 will be described later with reference to FIG. 14.

The positioning unit 103 performs positioning processing on the positioning terminal 10. To be more specific, the positioning unit 103 outputs a receiving instruction of a GPS signal to the GPS signal receiving unit 101 according to a positioning instruction from the continuous positioning control unit 109 which will be described later and receives the GPS signal from the GPS signal receiving unit 101. Furthermore, the positioning unit 103 calculates position information based on the GPS signal received from the GPS signal receiving unit 101 and stores the calculated position information in the route storage unit 104. Here, the position information is information indicating the current position of the positioning terminal 10 and is, for example, a latitude and a longitude.

Figure 5:
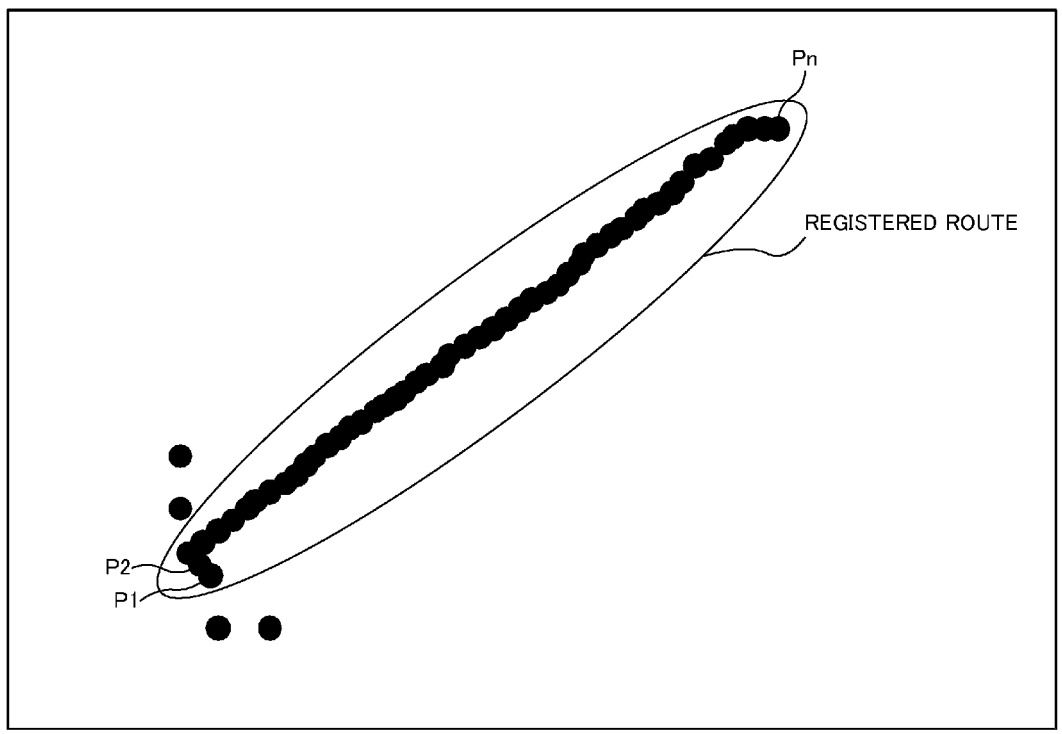
FIG. 5 is a schematic view of a registered route stored in a route storage unit according to the first embodiment of the present invention.

The route storage unit 104 (storage unit) stores a registered route registered as a route through which the positioning terminal 10 frequently passes. FIG. 5 is a schematic view of the registered route stored in the route storage unit 104. As shown in FIG. 5, the registered route is formed by concatenating location points indicated by position information previously acquired by the positioning unit 103.

As shown in FIG. 5, all location points indicated by the position information acquired by the positioning unit 103 within a predetermined period (e.g., one week, one month) are mapped on a map and location points P1 to Pn whose density on the map exceeds a predetermined value are extracted. The route storage unit 104 may concatenate the location points P1 to Pn extracted in this way and store the location points as a registered route.

Furthermore, the route storage unit 104 may concatenate location points P1 to Pn acquired by the positioning unit 103 in the period from receiving a start instruction of route registration from a user to receiving an end instruction (that is, the period from the departure point to the destination of the route to be registered) and store the location points as a registered route.

FIG. 6 is a diagram illustrating an example of registered route stored in the route storage unit 104. As shown in FIG. 6, the route storage unit 104 stores position information indicating location points P1 to Pn forming a registered route in association with the day of the week and time on which the position information was acquired by the positioning unit 103.

The cell/sector information acquiring unit 105 acquires cell/sector information reported from the radio base station 30 via the communication unit 102. Here, the cell/sector information is information on a cell or sector in which the positioning terminal 10 locates.

The route matching determining unit 106 (determining unit) determines whether or not the positioning terminal 10 moves on a registered route stored in the route storage unit 104 and outputs the determination result to the continuous positioning control unit 109. Detailed determination conditions of the above described determination (that is, route matching determination) by the route matching determining unit 106 will be described later with reference to FIG. 8.

Furthermore, the route matching determining unit 106 determines whether or not the positioning terminal 10 has deviated from the registered route stored in the route storage unit 104 and outputs the determination result to the continuous positioning control unit 109. Detailed determination conditions of the above described determination (that is, route deviation determination) by the route matching determining unit 106 will be described later with reference to FIG. 11.

The walking detection unit 107 is configured by, for example, an acceleration sensor and detects a moving distance of the positioning terminal 10 for a predetermined period (e.g., 5 minutes).

The mobility determining unit 108 determines whether or not the positioning terminal 10 is moving and outputs the determination result to the continuous positioning control unit 109. To be more specific, when the moving distance detected by the walking detection unit 107 is equal to or more than a predetermined distance (e.g., 30 m), the mobility determining unit 108 determines that the positioning terminal 10 is moving. Furthermore, even when the moving distance detected by the walking detection unit 107 is less than the predetermined distance, if switching of a cell or sector is detected based on the cell/sector information acquired by the cell/sector information acquiring unit 105, the mobility determining unit 108 may determine that the positioning terminal 10 is moving.

The continuous positioning control unit 109 (positioning interval control unit) controls a positioning interval at which the positioning unit 103 performs positioning processing based on the determination result from the route matching determining unit 106 and outputs a positioning instruction so that the positioning unit 103 performs positioning processing at a controlled positioning interval.

When the route matching determining unit 106 determines that the positioning terminal 10 moves on a registered route, the continuous positioning control unit 109 changes the positioning interval of the positioning unit 103 from a time interval TI1 (first time interval) to a time interval TI2 (second time interval). Here, "time interval TI1" is a predetermined time interval and is set, for example, to 5 minutes. On the other hand, "time interval TI2" is a time interval longer than the time interval TI1 and is set, for example, to 15 minutes.

On the other hand, when the route matching determining unit 106 determines that the positioning terminal 10 has deviated from the registered route, the continuous positioning control unit 109 changes the positioning interval of the positioning unit 103 from the time interval TI2 to the time interval TI1 again.

Furthermore, when the mobility determining unit 108 determines that the positioning terminal 10 is moving, the continuous positioning control unit 109 may output a positioning instruction to the positioning unit 103. On the other hand, when the mobility determining unit 108 determines that the positioning terminal 10 is not moving, the continuous positioning control unit 109 may stop outputting the positioning instruction to the positioning unit 103.

Next, the operation of the continuous positioning system according to the first embodiment configured as shown above will be described.

Positioning Operation of Positioning Terminal

Figure 7:
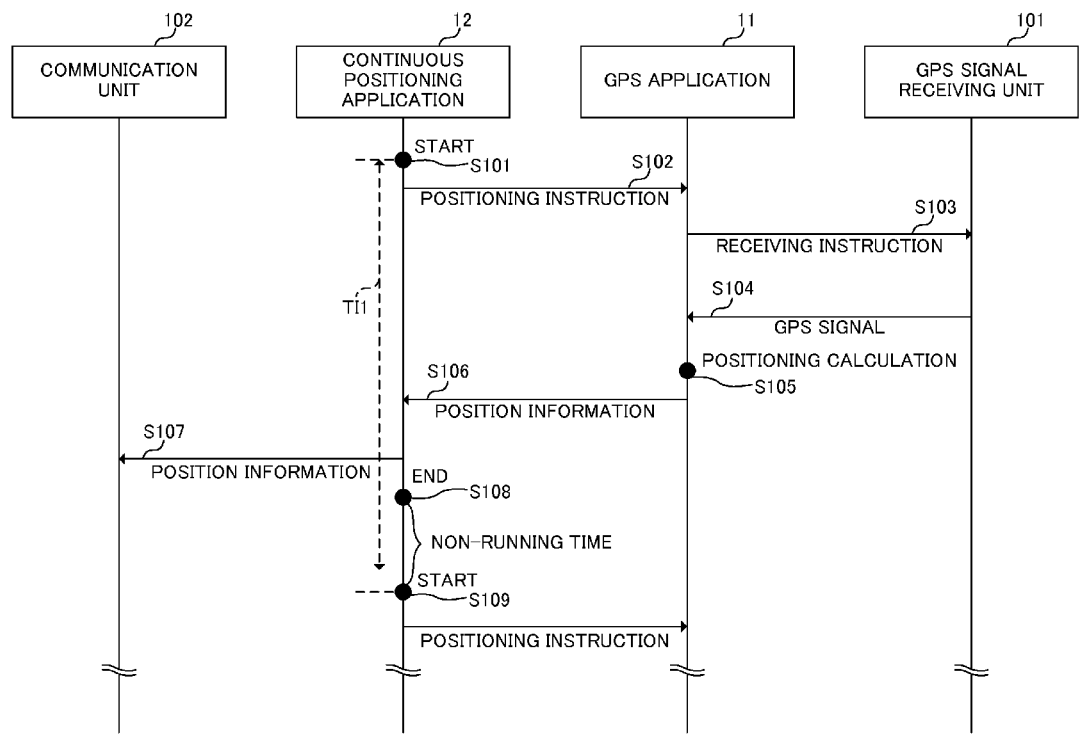
FIG. 7 is a sequence diagram indicating positioning operation of the positioning terminal according to the first embodiment of the present invention.

FIG. 7 is a sequence diagram showing a positioning operation by the GPS application 11 and the continuous positioning application 12 installed in the positioning terminal 10.

The continuous positioning application 12 installed in the positioning terminal 10 is started at the time interval TI1 (step S101). The started continuous positioning application 12 outputs a positioning instruction to the GPS application 11 (step S102).

The GPS application 11 outputs a receiving instruction of a GPS signal to the GPS signal receiving unit 101 according to the positioning instruction from the continuous positioning application 12 (step S103). The GPS signal receiving unit 101 receives the GPS signal from the GPS satellite 20 according to the receiving instruction from the GPS application 11 and outputs the received GPS signal to the GPS application 11 (step S104).

The GPS application 11 calculates the position information of the positioning terminal 10 based on the GPS signal from the GPS signal receiving unit 101 (step S105). The GPS application 11 transmits the calculated position information to the continuous positioning application 12 (step S106). The continuous positioning application 12 transmits the position information from the GPS application 11 to the information delivery server 50 via the communication unit 102 (step S107).

The continuous positioning application 12 ends (step S108) and restarts after a predetermined period (step S109). Thus, since the continuous positioning application 12 is constructed as a native application that directly operates on the OS, the continuous positioning application 12 can be run discontinuously. Therefore, the continuous positioning application 12 is not necessary to run continuously as in the case where the continuous positioning application 12 is constructed as a Java (registered trademark) application, which allows power consumption to be reduced during a non-running time.

The functions of the continuous positioning control unit 109, route matching determining unit 106, positioning unit 103 or the like of the positioning terminal 10, which will be described in detail below, are realized by the continuous positioning application 12 and the GPS application 11 that perform the above described positioning operation. In the present invention, the positioning interval of the positioning unit 103 is controlled as will be described later, and a non-running time of the continuous positioning application 12 in FIG. 7 is thereby increased and as a result, it is possible to realize further power saving.

Route Matching Determination Operation by Positioning Terminal

Figure 8:
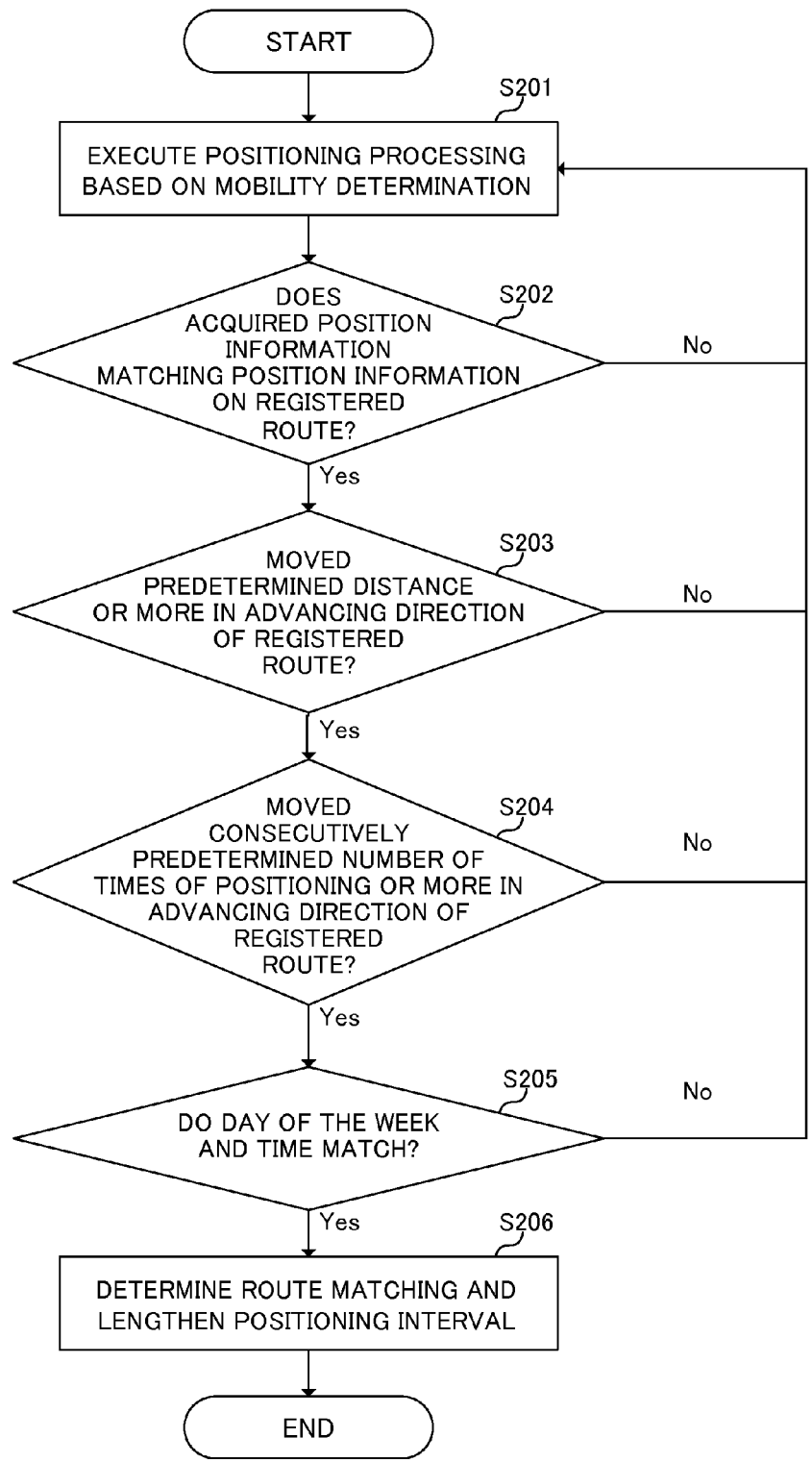
FIG. 8 is a flowchart illustrating a route matching operation of the positioning terminal according to the first embodiment of the present invention.

Next, the route matching determination operation by the positioning terminal 10 will be described with reference to FIGS. 8 to 10. FIG. 8 is a flowchart showing a route matching determination operation by the positioning terminal 10. Furthermore, FIGS. 9 and 10 are diagrams illustrating a relationship between the route matching determination result according to the flow in FIG. 8 and the positioning interval by the positioning unit 103.

Figure 9:
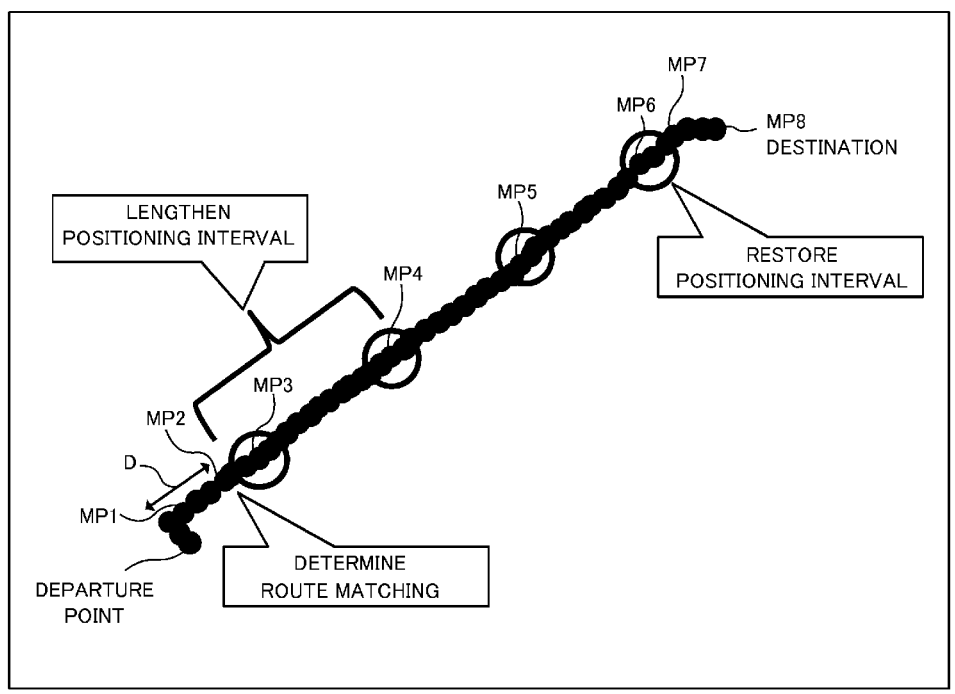
FIG. 9 is a diagram illustrating a relationship between a route matching determination result and a positioning interval according to the first embodiment of the present invention.
Figure 10:
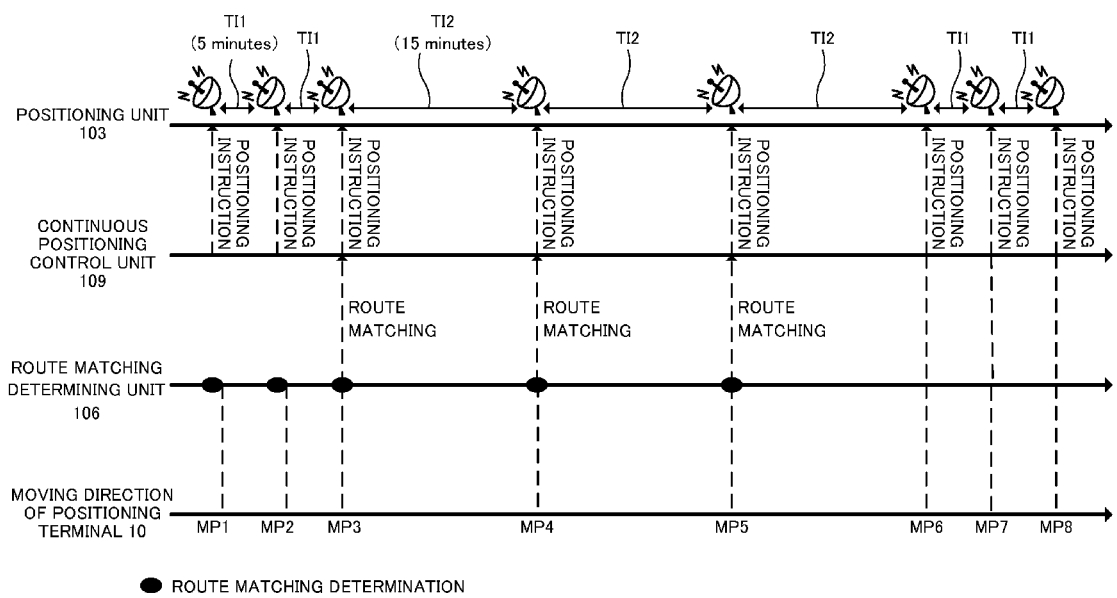
FIG. 10 is a diagram illustrating a relationship between a route matching determination result and a positioning interval according to the first embodiment of the present invention.

Positioning points MP1 to MP8 shown in FIG. 9 and FIG. 10 indicate points at which the positioning unit 103 acquires position information. Furthermore, the flow in FIG. 8 is executed at each point (that is, positioning points MP1 to MP5 in FIG. 9 and FIG. 10) until the distance to the destination becomes less than a predetermined distance.

As shown in FIG. 8, the continuous positioning control unit 109 of the positioning terminal 10 instructs the positioning unit 103 to perform positioning processing based on the determination result from the mobility determining unit 108 (step S201). To be more specific, only when the mobility determining unit 108 determines that the positioning terminal 10 is moving, the continuous positioning control unit 109 outputs a positioning instruction to the positioning unit 103 and instructs the positioning unit 103 to perform positioning processing.

The route matching determining unit 106 determines whether or not the position information acquired by the positioning unit 103 in step S201 matches the position information on the registered route stored in the route storage unit 104 (step S202). For example, since the positioning point MP1 in FIG. 9 exists on the registered route, it is determined at the positioning point MP1 that the position information acquired by the positioning unit 103 matches position information on the registered route.

When the position information acquired by the positioning unit 103 matches position information on the registered route stored in the route storage unit 104 (step S202; Yes), the route matching determining unit 106 determines whether or not the positioning terminal 10 has moved a predetermined distance or more in the advancing direction of the registered route (step S203). It is determined at the positioning point MP1 in FIG. 9 that the positioning terminal 10 has not moved a predetermined distance D or more in the advancing direction of the registered route. On the other hand, it is determined at the positioning points MP2 to MP5 that the positioning terminal 10 has moved a predetermined distance D or more in the advancing direction of the registered route.

When the positioning terminal 10 has moved a predetermined distance or more in the advancing direction of the registered route (step S203; Yes), the route matching determining unit 106 determines whether or not the positioning terminal 10 has consecutively moved a predetermined number of times of positioning or more in the advancing direction of the registered route (step S204). When, for example, the predetermined number of times of positioning is set to 2, since the positioning terminal 10 has not consecutively moved a predetermined number of times of positioning or more in the advancing direction of the registered route at the positioning point MP2 in FIG. 9, it is determined that the positioning terminal 10 has not consecutively moved the predetermined number of times of positioning or more in the advancing direction of the registered route. On the other hand, since the positioning terminal 10 has consecutively moved two or more times in the advancing direction of the registered route at the positioning points MP3 to MP5, it is determined that the positioning terminal 10 has consecutively moved the predetermined number of times of positioning or more in the advancing direction of the registered route.

When the positioning terminal 10 has consecutively moved the predetermined number of times of positioning or more in the advancing direction of the registered route (step S204; Yes), the route matching determining unit 106 determines in step S201 whether or not the day of the week and time on which the positioning unit 103 acquired the position information match the day of the week and time stored in the route storage unit 104 in association with the position information on the registered route (step S205).

In step S201, when the day of the week and time on which the positioning unit 103 acquired the position information match the day of the week and time stored in association with the position information on the registered route (step S205; Yes), the route matching determining unit 106 determines that the positioning terminal 10 moves on the registered route and outputs the route matching determination result to the continuous positioning control unit 109. The continuous positioning control unit 109 changes the positioning interval of the positioning unit 103 from the time interval TI1 to the time interval TI2 which is longer than the time interval TI1 according to the route matching determination result from the route matching determining unit 106 (step S206).

For example, when the route matching determining unit 106 determines, at the positioning point MP3 in FIG. 9 and FIG. 10, that the positioning terminal 10 moves on the registered route, the continuous positioning control unit 109 changes the positioning interval of the positioning unit 103 from the time interval TI1 to the time interval TI2. As a result, it is possible to reduce the number of times of positioning by the positioning unit 103 and thereby prevent power consumption of the positioning terminal 10 from increasing.

In FIG. 8, when the position information acquired by the positioning unit 103 does not match the position information on the registered route stored in the route storage unit 104 (step S202; No), or when the positioning terminal 10 has not moved the predetermined distance or more in the advancing direction of the registered route (step S203; No), or when the positioning terminal 10 has not consecutively moved the predetermined number of times of positioning or more in the advancing direction of the registered route (step S204; No), or when the day of the week and time on which the positioning unit 103 acquired the position information in step S201 does not match the day of the week and time stored in association with the position information on the registered route (step S205; No), the present operation returns to step S201.

Furthermore, one or all determinations in steps S203 to S205 in FIG. 8 may be omitted.

Furthermore, as shown in FIGS. 9 and 10, when the distance to the destination on the registered route becomes smaller than a predetermined distance, the continuous positioning control unit 109 changes the positioning interval of the positioning unit 103 from the time interval TI2 to the time interval TI1 which is shorter than the time interval TI2.

(3) Route Deviation Determination Operation of Positioning Terminal

Figure 11:
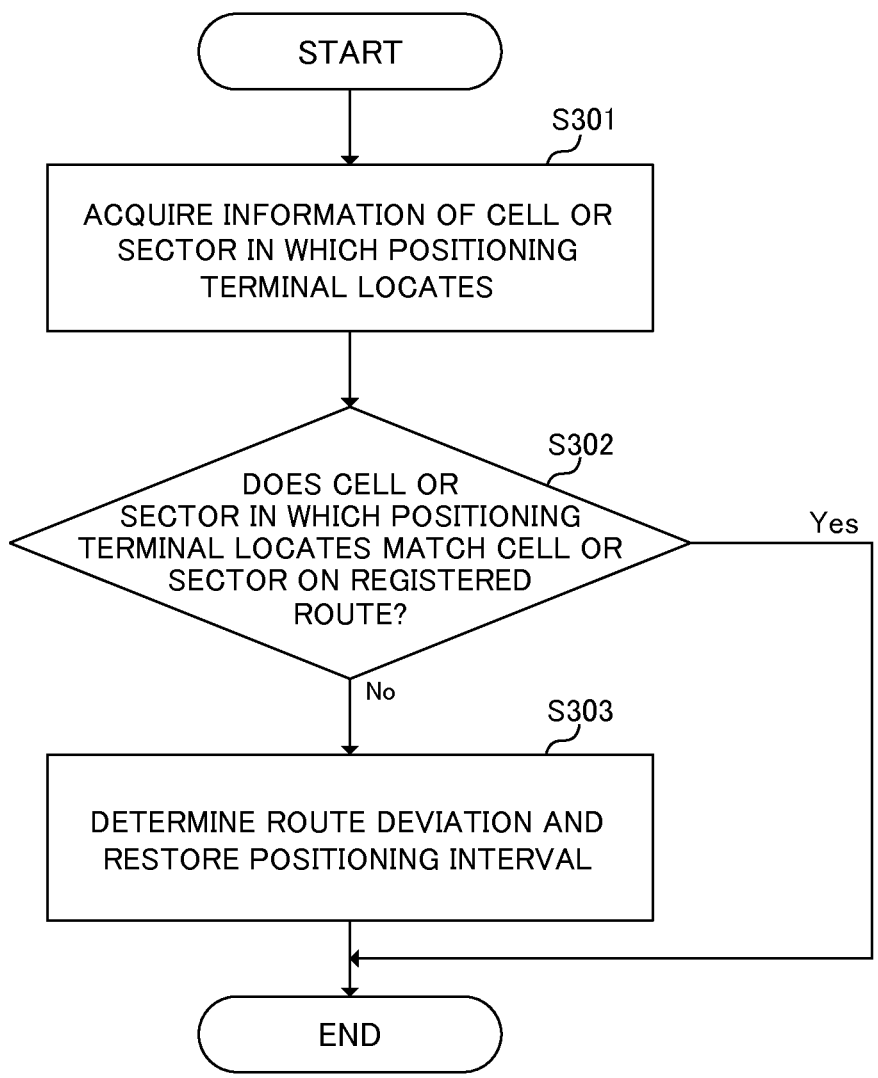
FIG. 11 is a flowchart illustrating a route deviation operation of the positioning terminal according to the first embodiment of the present invention.

Next, the route deviation determination operation by the positioning terminal 10 will be described with reference to FIG. 11 to FIG. 13. FIG. 11 is a flowchart illustrating a route deviation determination operation by the positioning terminal 10. Furthermore, FIGS. 12 and 13 illustrate a relationship between the route deviation determination result according to the flow in FIG. 11 and the positioning interval by the positioning unit 103.

Figure 12:
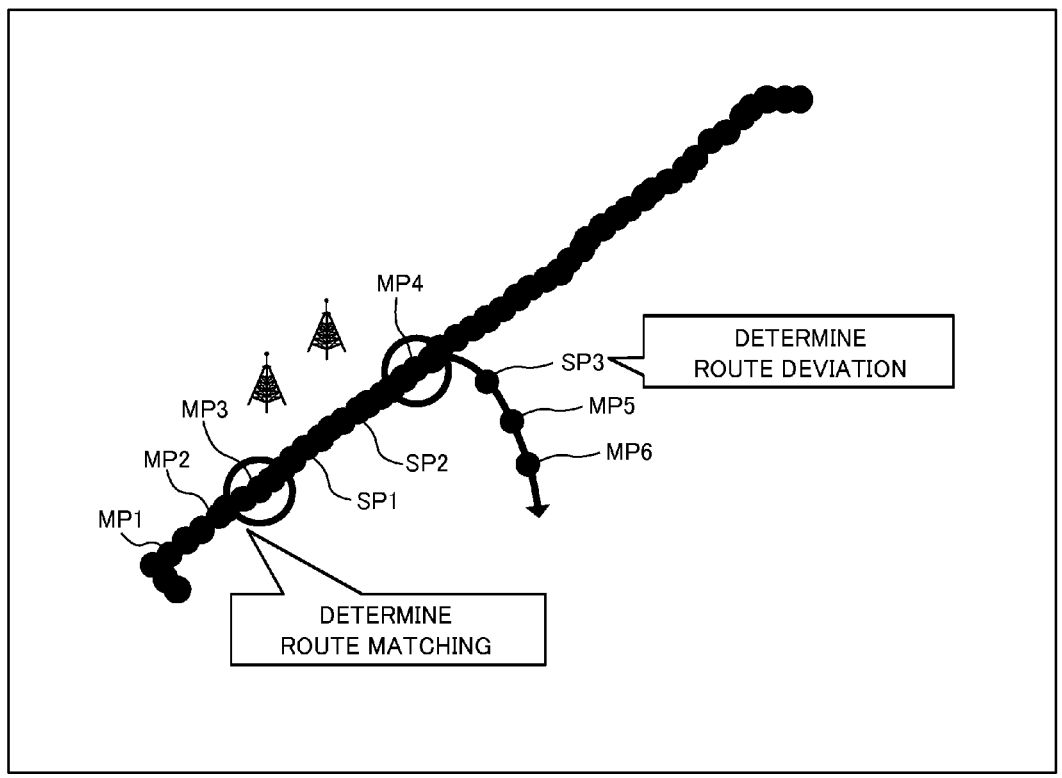
FIG. 12 is a diagram illustrating a relationship between a route deviation determination result and a positioning interval according to the first embodiment of the present invention.
Figure 13:
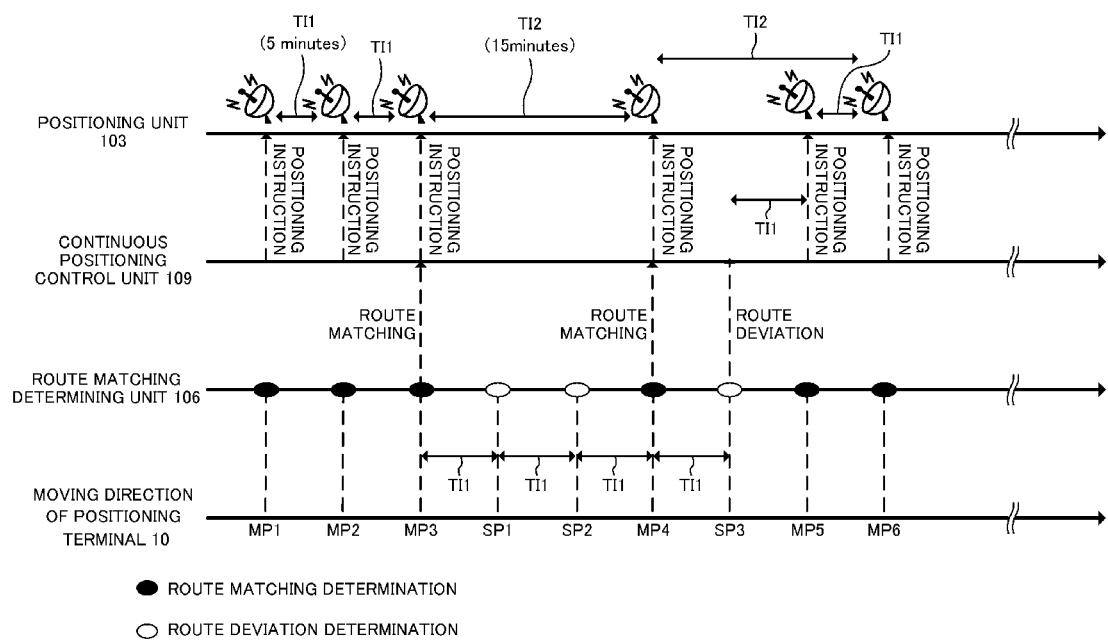
FIG. 13 is a diagram illustrating a relationship between a route deviation determination result and a positioning interval according to the first embodiment of the present invention.

Positioning points MP1 to MP6 shown in FIGS. 12 and 13 indicate points at which the positioning unit 103 acquires position information, and skip points SP1 to SP3 indicate points at which the positioning processing at the time interval TI1 is omitted due to changing the positioning interval by the positioning unit 103 to the time interval TI2. Furthermore, the flow in FIG. 11 is executed at each point where the positioning processing by the positioning unit 103 has been omitted (that is, skip points SP1 to SP4 in FIG. 12).

As shown in FIG. 11, the route matching determining unit 106 acquires information on the cell or sector in which the positioning terminal 10 locates from the cell/sector information acquiring unit 105 (step S301).

The route matching determining unit 106 determines whether or not the cell or sector in which the positioning terminal 10 locates matches the cell or sector on the registered route stored in the route storage unit 104 (step S302). For example, at skip points SP1 and SP2 in FIG. 12, it is determined that the cell or sector in which the positioning terminal 10 locates matches the cell or sector on the registered route. On the other hand, at skip point SP3, it is determined that the cell or sector in which the positioning terminal 10 locates does not match the cell or sector on the registered route.

When the cell or sector in which the positioning terminal 10 locates matches the cell or sector on the registered route (step S302; Yes), the route matching determining unit 106 determines that the positioning terminal 10 has not deviated from the registered route, and therefore the present operation ends.

When the cell or sector in which the positioning terminal 10 locates does not match the cell or sector on the registered route (step S302; No), the route matching determining unit 106 determines that the positioning terminal 10 has deviated from the registered route and outputs the route deviation determination result to the continuous positioning control unit 109. The continuous positioning control unit 109 changes the positioning interval of the positioning unit 103 from the time interval TI2 to the time interval TI1 which is shorter than the time interval TI2 again according to the route deviation determination result from the route matching determining unit 106 (step S303).

When, for example, the route matching determining unit 106 determines at skip point SP3 in FIG. 12 and FIG. 13 that the positioning terminal 10 has deviated from the registered route, the continuous positioning control unit 109 changes the positioning interval of the positioning unit 103 from the time interval TI2 to the time interval TI1 again. When the positioning terminal 10 has deviated from the registered route in this way, the positioning interval of the positioning unit 103 can be restored to the original condition.

Position Information Reporting Operation of Positioning Terminal

Figure 14:
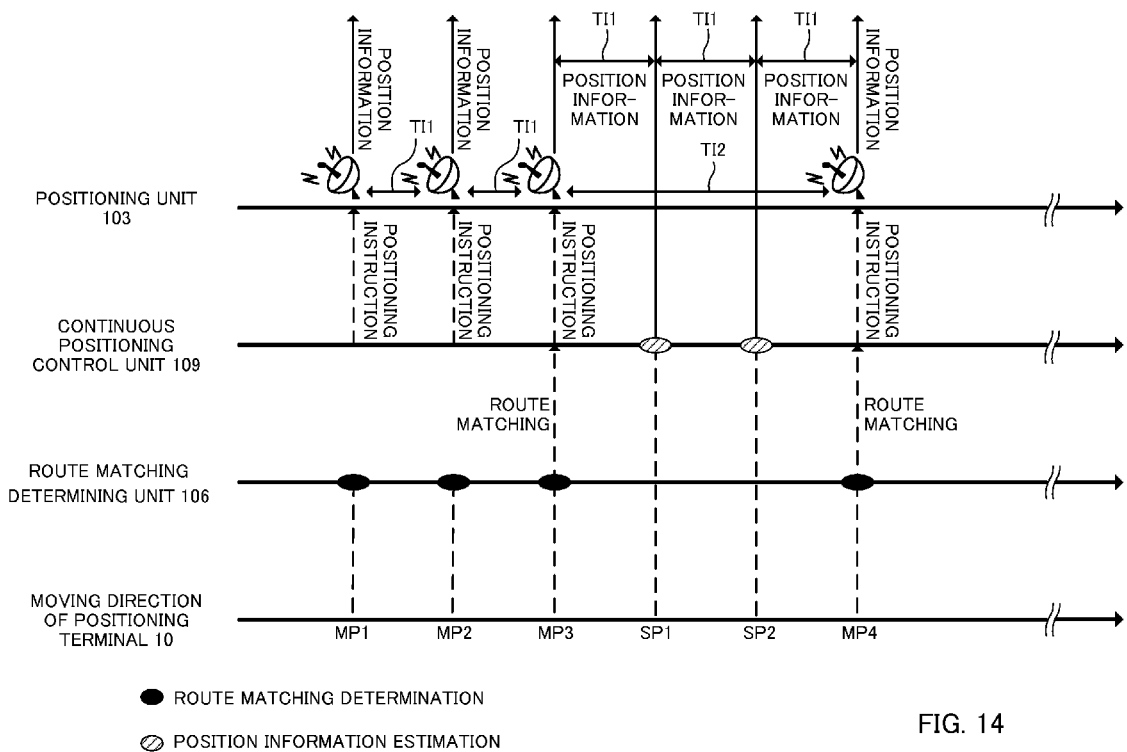
FIG. 14 is a diagram illustrating a reporting operation of position information by the positioning terminal according to the first embodiment of the present invention.

Next, the position information reporting operation by the positioning terminal 10 to the information delivery server 50 will be described with reference to FIG. 14. FIG. 14 illustrates the position information reporting operation by the positioning terminal 10. Although FIG. 14 does not illustrate the communication unit 12, suppose the position information is transmitted to the information delivery server 50 via the communication unit 12.

As shown in FIG. 14, when the positioning unit 103 acquires position information at positioning points MP1 to MP4, the communication unit 102 transmits the acquired position information to the information delivery server 50.

Here, since the positioning unit 103 does not perform positioning processing at skip points SP1 and SP2 as described above, the position information is not acquired. Thus, the continuous positioning control unit 109 estimates position information at skip points SP1 and SP2 and outputs the estimated position information to the communication unit 102.

To be more specific, the continuous positioning control unit 109 estimates position information at skip points SP1 and SP2 based on the history of the position information acquired at positioning points MP1 to MP3 and the position information on the registered route stored in the route storage unit 104.

The communication unit 102 transmits the position information estimated by the continuous positioning control unit 109 at skip points SP1 and SP2 to the information delivery server 50. As a result, the positioning terminal 10 can acquire the information corresponding to the current position from the information delivery server 50 even when the positioning processing is omitted.

In the continuous positioning system according to the first embodiment, when it is determined that the positioning terminal 10 moves on the registered route, the positioning interval of the positioning unit 103 is changed from the time interval TI1 to the time interval TI2 which is longer than the time interval TI1, and thereby it is possible to reduce the number of times of positioning processing by the positioning unit 103 and thus prevent power consumption of the positioning terminal 10 from increasing.

Thus, when the positioning processing is omitted based on the route matching determination by the positioning terminal 10, it is possible to reduce the total number of times of positioning from the departure point to the destination. When the positioning processing is omitted only based on the mobility determination of the positioning terminal 10, the total number of times of positioning from the departure point to the destination is approximately same even on the same route. Therefore, the continuous positioning system according to the first embodiment can achieve power saving of the positioning terminal 10 more than the prior art that omits the positioning processing based on mobility determination.

Further, in the continuous positioning system according to the first embodiment, when it is determined that the positioning terminal 10 deviates from the registered route, the positioning interval of the positioning unit 103 is changed from the time interval TI2 to the time interval TI1 again, and thereby it is possible to achieve power saving of the positioning terminal 10 without damaging the convenience of the user of the positioning terminal 10.

Furthermore, in the continuous positioning system according to the first embodiment, also when the positioning processing by the positioning unit 103 is omitted, position information to the information is transmitted to the delivery server 50 and information corresponding to the position information is acquired from the information delivery server 50, and thereby it is possible to achieve power saving of the positioning terminal 10 without damaging the convenience of the user of the positioning terminal 10.

Next, a continuous positioning system according to a second embodiment will be described focusing on differences from the first embodiment. In the second embodiment, the information delivery server 50 instead of the positioning terminal 10 makes the above described route matching determination and route deviation determination. Such route matching determination and route deviation determination may also be made by a server dedicated to determination provided independently of the information delivery server 50.

Figure 15:
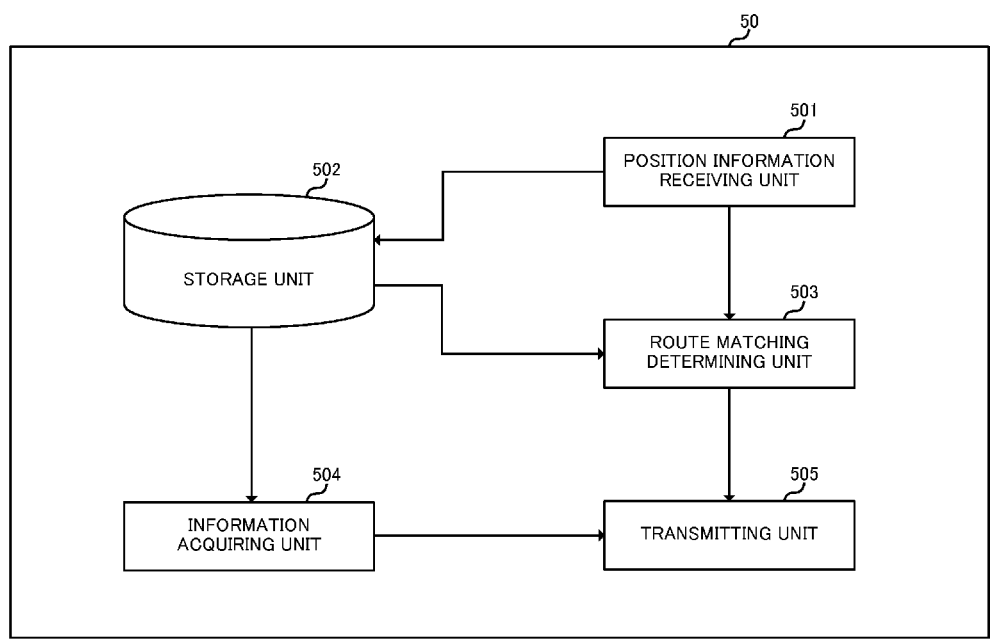
FIG. 15 is a functional configuration diagram of an information delivery server according to a second embodiment of the present invention.

FIG. 15 is a functional configuration diagram of the information delivery server 50 (server) according to the second embodiment. As shown in FIG. 15, the information delivery server 50 includes a position information receiving unit 501, a storage unit 502, a route matching determining unit 503, an information acquiring unit 504 and a transmitting unit 505.

The position information receiving unit 501 (receiving unit) receives, from the positioning terminal 10, position information indicating the current position of the positioning terminal 10 and outputs the received position information to the storage unit 502 and the route matching determining unit 503. Furthermore, the position information receiving unit 501 may also receive the day of the week and time on which the position information was acquired by the positioning terminal 10 in addition to the position information.

The storage unit 502 stores registered routes formed by concatenating location points indicated by position information previously received by the position information receiving unit 501. To be more specific, as described with reference to FIG. 6, the storage unit 502 stores registered routes. Furthermore, the storage unit 502 stores information corresponding to the position information (e.g., weather information and sightseeing information at the current position, information on the last train from the current site).

The route matching determining unit 503 (determining unit) determines whether or not the positioning terminal 10 moves on a registered route stored in the storage unit 502 and outputs the determination result to the transmitting unit 505. Detailed determination conditions of such route matching determination are as described with reference to FIG. 8. Furthermore, the route matching determining unit 503 determines whether or not the positioning terminal 10 has deviated from the registered route and outputs the determination result to the transmitting unit 505. Detailed determination conditions of such route deviation determination are as described with reference to FIG. 11.

The information acquiring unit 504 acquires, from the storage unit 502, information corresponding to the position information received by the position information receiving unit 501 and outputs the acquired information to the transmitting unit 505. The transmitting unit 505 (reporting unit) transmits the determination result from the route matching determining unit 503 and the information acquired by the information acquiring unit 504 to the positioning terminal 10.

In the second embodiment, the communication unit 102 of the positioning terminal 10 receives the route matching determination or route deviation determination from the information delivery server 50.

When the communication unit 102 receives a determination result that the positioning terminal 10 moves on the registered route, the continuous positioning control unit 109 changes the positioning interval of the positioning unit 103 from the time interval TI1 to the time interval TI2 which is longer than the time interval TI1.

Furthermore, when the communication unit 102 receives a determination result that the positioning terminal 10 has deviated from the registered route, the continuous positioning control unit 109 changes the positioning interval of the positioning unit 103 from the time interval TI2 to the time interval TI1 again.

In the continuous positioning system according to the second embodiment, the positioning terminal 10 is not necessary to perform route matching determination or route deviation determination and it is thereby possible to reduce power consumption of the positioning terminal 10 involved in the determination processing.

The present invention has been described in detail using the aforementioned embodiments, but it is obvious for those skilled in the art that the present invention is not limited to the embodiments described in the present specification.

For example, although a case has been described in the above described embodiments where the positioning terminal 10 performs positioning processing based on a GPS signal from the GPS satellite 20, the present invention is not limited to this, but positioning processing may also be performed based on various kinds of radio signal such as Wi-Fi.

As described so far, the present invention can be implemented as modified or altered embodiments without departing from the spirit and scope of the present invention defined in the scope of claims of the present invention. Therefore, the descriptions of the present specification are intended for illustrative purposes and have no restrictive meaning for the present invention.

What is claimed is:

1. A positioning terminal comprising:
   a positioning unit configured to perform positioning processing for acquiring position information which indicate a current position of the positioning terminal;
   a storage unit configured to store a registered route formed by concatenating location points indicated by position information previously acquired by the positioning unit;
   a determining unit configured to determine whether or not the positioning terminal moves on the registered route; and
   a positioning interval control unit configured to change a positioning interval at which the positioning unit performs the positioning processing from a first time interval to a second time interval which is longer than the first time interval, when the determining unit determines that the positioning terminal moves on the registered route.

2. The positioning terminal according to claim 1, wherein the determining unit is configured to determine that the positioning terminal moves on the registered route, when position information newly acquired by the positioning unit matches position information on the registered route.

3. The positioning terminal according to claim 2, wherein the determining unit is configured to determine that the positioning terminal moves on the registered route, when the positioning terminal has moved a predetermined distance or more in an advancing direction of the registered route.

4. The positioning terminal according to claim 2, wherein the determining unit is configured to determine that the positioning terminal moves on the registered route, when the positioning terminal has consecutively moved a predetermined number of times or more in an advancing direction of the registered route.

5. The positioning terminal according to claim 2, wherein the storage unit is configured to store position information on the registered route in association with a day of the week and time on which the position information was acquired by the positioning unit, and
   the determining unit is configured to determine that the positioning terminal moves on the registered route, when a day of the week and time on which position information newly acquired by the positioning unit match the day of the week and time stored in the storage unit in association with the position information on the registered route.

6. The positioning terminal according to claim 1, wherein the determining unit is configure to determine whether or not a cell or sector in which the positioning terminal locates is a cell or sector on the registered route and thereby to determine whether or not the positioning terminal has deviated from the registered route, when the positioning interval control unit changes the positioning interval to the second time interval and the positioning processing at the first time interval is omitted, and
   the positioning interval control unit is configured to change the positioning interval from the second time interval to the first time interval, when the determining unit determines that the positioning terminal has deviated from the registered route.

7. The positioning terminal according to claim 1, further comprising:
   a position information reporting unit configured to report position information acquired by the positioning unit to an information delivery server which delivers information corresponding to the position information to the positioning terminal; and an estimation unit configured to estimate position information of the positioning terminal, when the positioning interval is changed to the second time interval and the positioning processing at the first time interval is omitted, wherein the position information reporting unit is configured to transmit position information estimated by the estimation unit to the information delivery server.

8. A positioning terminal comprising:

a positioning unit configured to perform positioning processing for acquiring position information which indicate a current position of the positioning terminal;

a position information reporting unit configured to transmit position information acquired by the positioning unit to a server;

a determination result receiving unit configured to receive, from the server, a determination result as to whether or not the positioning terminal moves on a registered route formed by concatenating location points indicated by position information previously acquired by the positioning unit; and a positioning interval control unit is configured to change a positioning interval at which the positioning unit performs the positioning processing from a first time interval to a second time interval which is longer than the first time interval, when the determination result receiving unit receives a determination result that the positioning terminal moves on the registered route.

9. A server comprising:

a receiving unit configured to receive, from a positioning terminal, position information indicating a current position of the positioning terminal;

a storage unit configured to store a registered route formed by concatenating location points indicated by position information previously received by the receiving unit;

a determining unit configured to determine whether or not the positioning terminal moves on the registered route; and a reporting unit configured to report a determination result by the determining unit to the positioning terminal so that the positioning terminal can change a positioning interval at which the positioning terminal performs the positioning processing from a first time interval to a second time interval which is longer than the first time interval, when the determining unit determines that the positioning terminal moves on the registered route.

\* \* \* \* \*